United States Patent [19]

Kiso et al.

[11] Patent Number: 5,030,169
[45] Date of Patent: Jul. 9, 1991

[54] CHAIN TENSIONER

[75] Inventors: Kimitsugu Kiso, Yokohama; Shigeru Okamura, Zushi, both of Japan

[73] Assignee: Nissan Motor Co., Ltd., Yokohama

[21] Appl. No.: 529,417

[22] Filed: May 29, 1990

[30] Foreign Application Priority Data

May 31, 1989 [JP] Japan .................. 1-63564[U]

[51] Int. Cl.⁵ .............................. F16H 7/08
[52] U.S. Cl. ...................... 474/110; 474/138
[58] Field of Search ............. 474/101, 109–111, 474/113–117, 133, 135, 136, 138

[56] References Cited

U.S. PATENT DOCUMENTS

| | | | |
|---|---|---|---|
| 4,077,272 | 3/1978 | Busso | 474/110 |
| 4,190,025 | 2/1980 | Wahl | 474/110 X |
| 4,674,996 | 6/1987 | Anno et al. | 474/110 |
| 4,713,044 | 12/1987 | Nakamura et al. | |
| 4,874,352 | 10/1989 | Suzuki | 474/111 X |

FOREIGN PATENT DOCUMENTS

| | | |
|---|---|---|
| 0212119 | 4/1987 | European Pat. Off. . |
| 58-17891 | 4/1983 | Japan . |
| 60-527 | 1/1985 | Japan . |
| 1481280 | 7/1977 | United Kingdom . |

Primary Examiner—Thuy M. Bui
Attorney, Agent, or Firm—Pennie & Edmonds

[57] ABSTRACT

A chain tensioner comprises a body which is received in a bore formed through a side wall of a chain case, and includes a generally cylindrical portion. A plunger is slidably received in the cylindrical portion so as to press a timing chain. A check valve is arranged in the body. A damping chamber is defined by the cylindrical portion and the plunger, and is fluidly communicated with an oil pump via an oil supply passage. On the other hand, an oil reservoir is defined by the bore and the body, and is fluidly communicated with the damping chamber through the check valve via an oil passage, and also with the damping chamber via a flow restrictor.

16 Claims, 5 Drawing Sheets

CHAIN TENSIONER

BACKGROUND OF THE INVENTION

The present invention relates to a chain tensioner.

Different types of chain tensioners have been proposed for providing the adequate tension to a chain. One of such chain tensioners is disclosed, for example, in JP-B2 No. 60-527, published on Jan. 8, 1985 in Japan.

JP-B2 No. 60-527 discloses a chain tensioner as shown in FIG. 6. Referring to FIG. 6, an engine cylinder block 64 is formed with a through bore 65. The chain tensioner includes a body 63 received in the bore 65 from the outside of an engine, a plunger 61 which is slidably received in the body 63, and a spring 62 for biasing the plunger 61 in such a direction as to protrude from the body 63.

An end portion of the plunger 61 protrudes inside the engine so as to press a chain (not shown)through a slide member (not shown). The tension of the chain is adjusted to an appropriate value by a force of spring 62.

JP-B2 No. 58-17891 discloses a chain tensioner. This chain tensioner comprises a body formed with a cylindrical bore having one end closed, and a plunger slidably received in the cylindrical bore. The plunger defines within the cylindrical bore a variable volume chamber. The body is formed with a recess serving as on oil reservoir. The body is provided with a one-way passage which allows a one-way flow of oil from the oil reservoir to the variable volume chamber. A flow restrictor is mounted in a passage formed through the body to restrict flow of oil from said variable volume chamber to the oil reservior. The oil within the oil reservoir is subject to atmospheric pressure. A spring is disposed within the body to bias the plunger in a direction to protrude from the body.

A problem encountered in the chain tensioner disclosed in JP-B2 No. 60-527 is that noise due to vibration of the chain is produced in expanding and contracting the spring 62 when the tension of the chain periodically varies with the variation of engine speed.

Another problem encountered in the chain tensioner disclosed in JP-B2 No. 58-17891 is although noise due to vibration of the chain is restrained by the presence of the oil reservoir, a restraint of noise is not sufficient that if the oil reservoir is small in capacity. On the other hand, in order to obtain sufficient restraint of noise, the oil reservoir should be larger, resulting in increase in size of the chain tensioner and/or difficulty to find a space or area for the oil reservoir.

SUMMARY OF THE INVENTION

It is, therefore, an object of the present invention to provide an arrangement wherein an oil reservoir of a chain tensioner is provided without any increase in size nor any substantial structural modification on an engine component part to which the chain tensioner is to be attached.

There is provided according to the present invention, an engine comprising:

a chain tensioner body formed with a cylindrical bore having one end closed;

a plunger slidably received in said cylindrical bore, said plunger defining within said cylindrical bore a variable volume chamber;

means for defining an oil reservoir;

one-way passage means for allowing a one-way flow of oil from said oil reservoir to said variable volume chamber, but preventing the reverse flow;

said oil reservoir defining means including, a predetermined engine component part with a mounting site;

said chain tensioner body cooperating with said predetermined engine component at said mounting site to define therebetween said oil reservoir.

DETAILED DESCRIPTION OF THE INVENTION

Referring to the accompanying drawings, a preferred embodiment of a chain tensioner according the present invention will be described.

Figure 1:
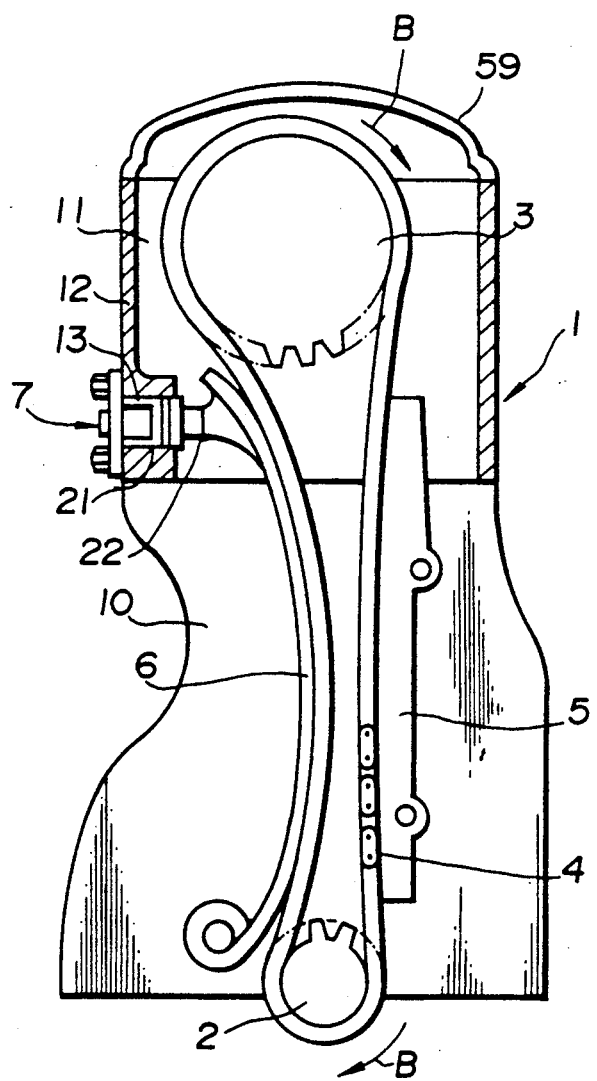
FIG. 1 is a front view, partly in section, illustrating an internal combustion engine to which a preferred embodiment of a chain tensioner according to the present invention is applied.

Referring to FIG. 1, an internal combustion engine 1 includes a cylinder clock 10, and a cylinder head 11 disposed thereon. A crankshaft is rotatably mounted to the cylinder block 10, whereas a camshaft is rotatably mounted to the cylinder head 11. A crank sprocket 2 is coupled with the crankshaft, whereas a cam sprocket 3 is coupled with the camshaft. A timing chain 4 drivingly interconnects the crank sprocket 2 and the cam sprocket 3, and circulates in a direction as indicated by arrows B in FIG. 1. A stationary chain guide 5 and a movable chain guide 6 are secured to the cylinder block 10. The stationary chain guide 5 is slidably in contact with the chain 4 at the tension side thereof, whereas the movable chain guide 6 is slidably in contact with the chain 4 at the loose side thereof. A chain tensioner 7 is disposed so as to press the movable chain guide 6 to the timing chain 4.

Figure 2:
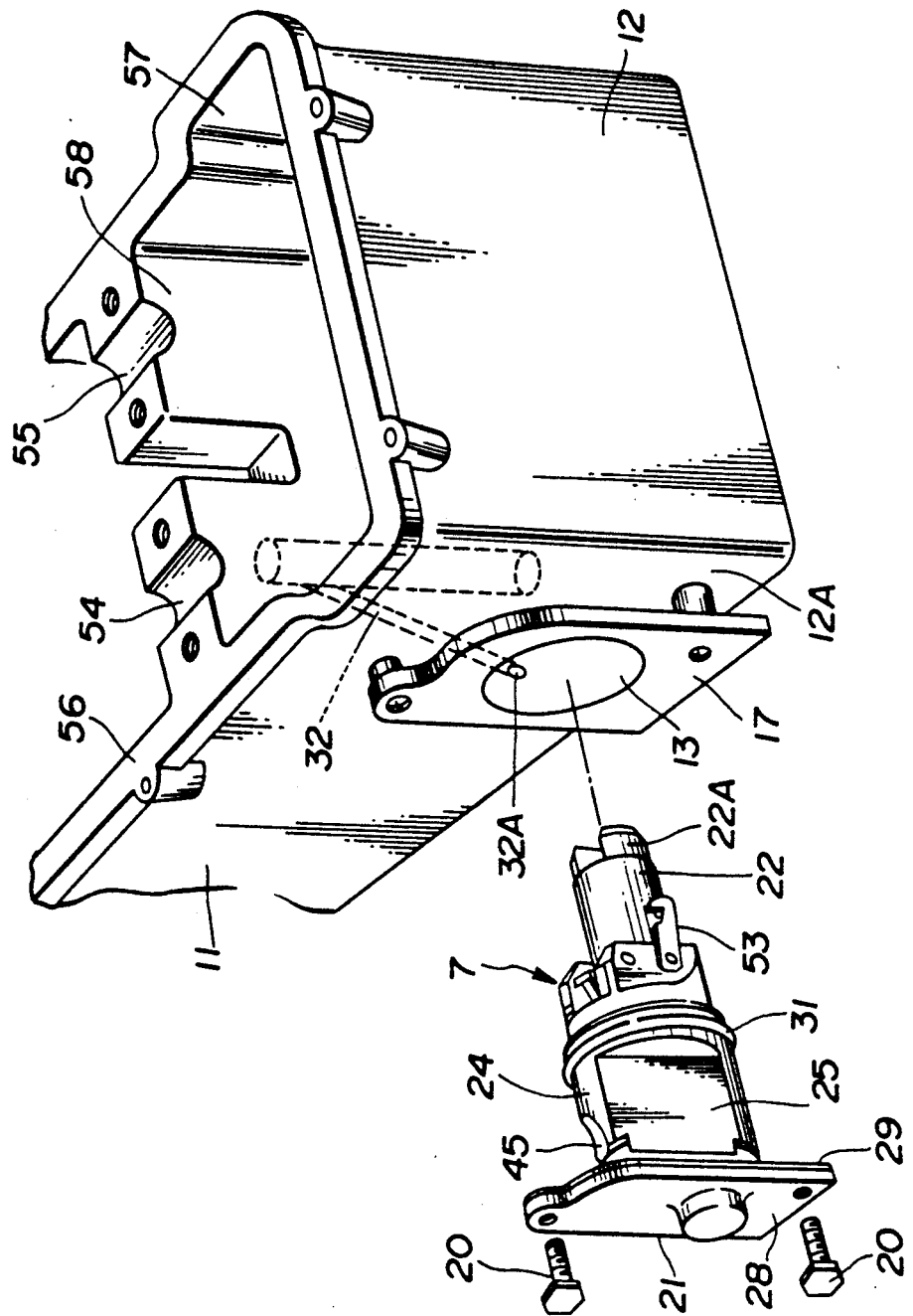
FIG. 2 is a perspective view illustrating a cylinder head with the chain tensioner detached.

Referring to FIG. 2, the cylinder head 11 is formed with two camshaft bearings 54 and 55, a flange 56, and a chain case 12. A cam cover 59 is attached to the cylinder head 11 through the flange 56. A chain chamber 57 is defined by the cam cover 59 and a front wall 58 of the cylinder head 11. The chain tensioner 7 is secured to the chain case 12.

Figure 3:
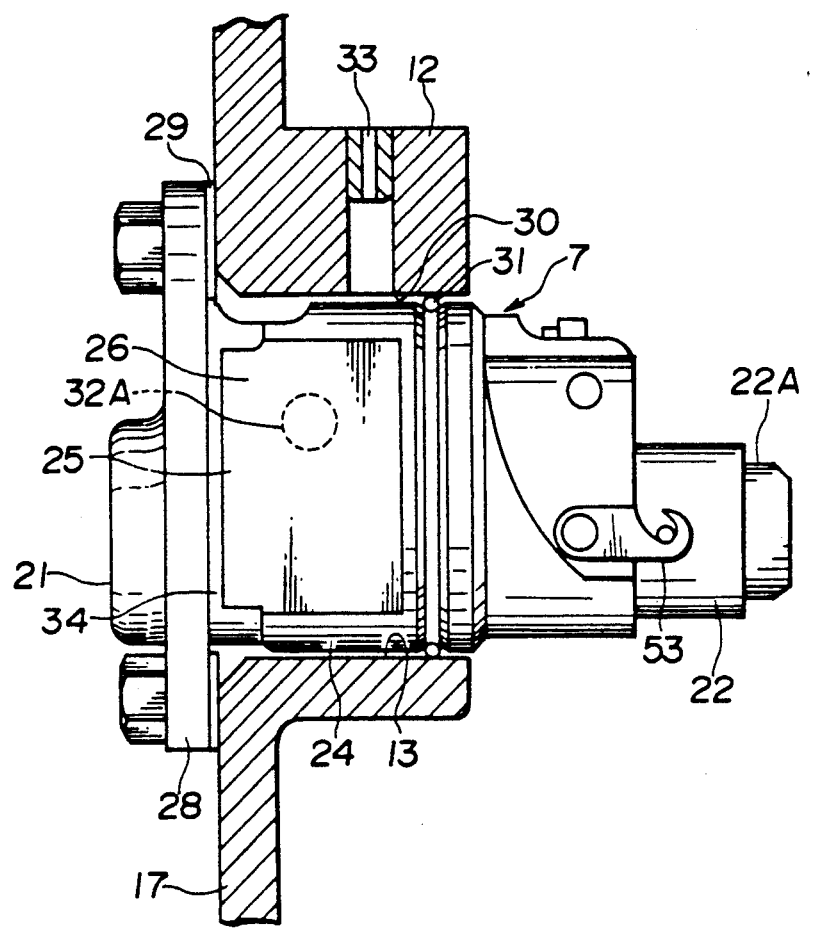
FIG. 3 is an enlarged detail illustrating the chain tensioner shown in FIG. 1.

As best seen in FIGS. 2 and 3, the chain tensioner 7 includes a body 21 shaped like a cylinder, and a plunger 22 which is slidably received in the body 21. The body 21 received in a bore 13 which is formed with a side wall 12A of the chain case 12. An end portion 22A of the plunger 22 is engaged with the movable chain guide 6.

Figure 4:
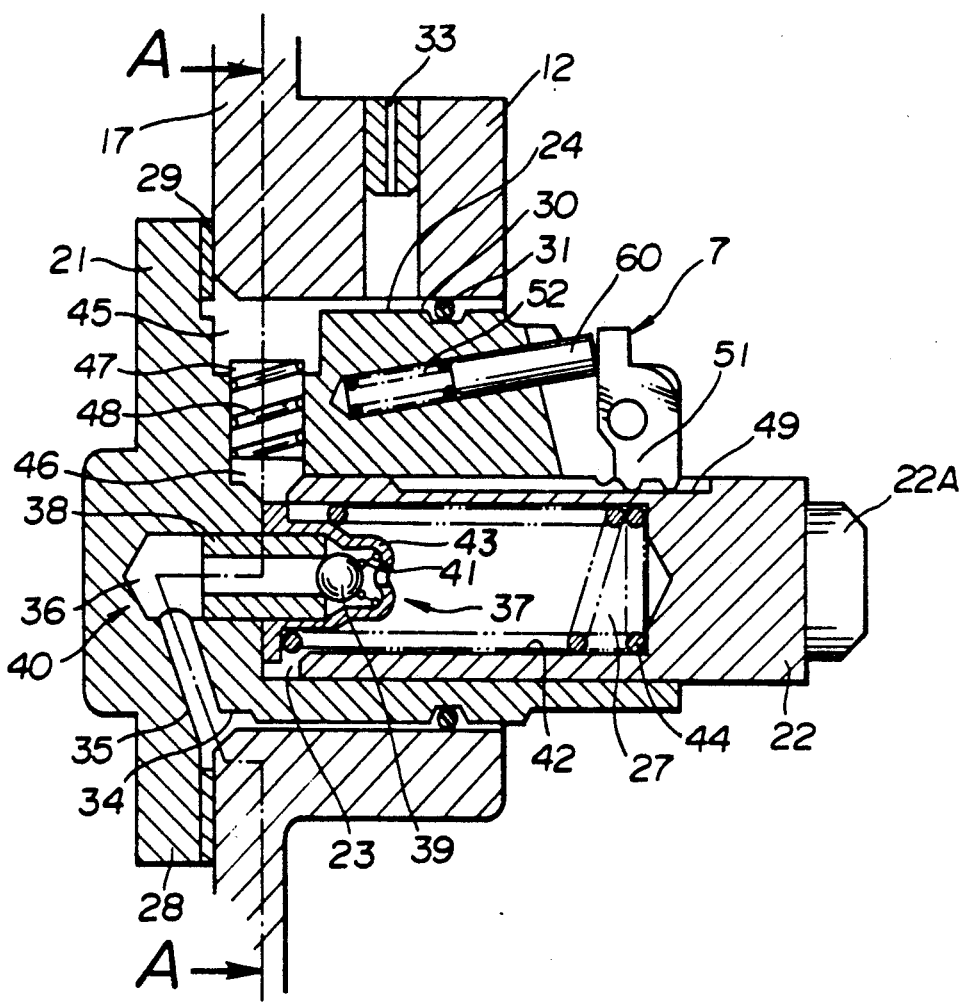
FIG. 4 is a longitudinal section illustrating the chain tensioner.
Figure 5:
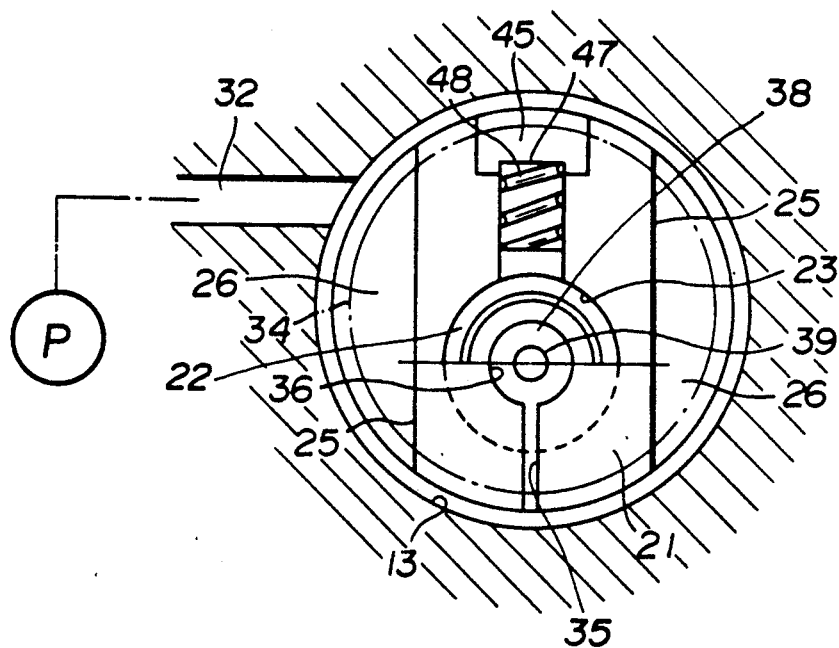
FIG. 5 is a view similar to FIG. 4, taken along the line A—A of FIG. 4.
Figure 6:
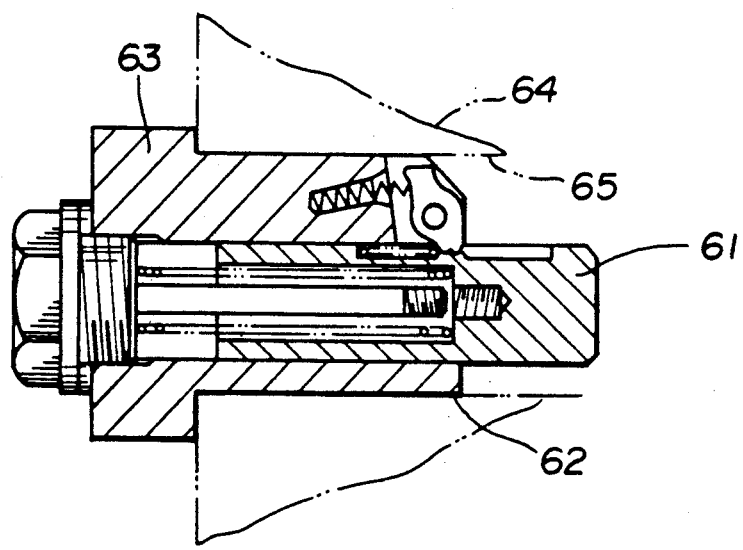
FIG. 6 is a view similar to FIG. 4, illustrating a conventionally proposed chain tensioner.

As best seen in FIGS. 4 and 5, the body 21 includes a generally cylindrical portion 23, and the plunder 22 is slidably received therein. A damping chamber 27 is defined by the cylindrical portion 23 and the plunder 22, whereas an oil reservoir 26 is defined by the bore 13 of the chain case 12 and the body 21.

As best seen in FIGS. 2 and 3, the body 21 has an outer peripheral surface 24 which is opposite to the bore 13 of the chain case 12 at a predetermined interval 30, and two lateral recesses 25 which bring a predetermined volume to the oil reservoir 26. The outer peripheral surface 24 is formed, at one end thereof, with a peripheral cutout 34 which allows fluid communication of the right portion of the oil reservoir 26 with the left portion thereof.

The body 21 includes a flange 28 for attachment to the chain case 12. For oil-tightly sealing the oil reservoir 26, a gasket 29 is interposed between the flange 28 and the chain case 12 and a seal member 31 is interposed between the outer peripheral surface 24 and a wall surface of the bore 13. The chain case 12 also includes a flange 17 for supporting the body 21. The body 21 is secured to the chain case 12 by means of two bolts 20.

As best seen in FIGS. 2 and 5, pressure oil is supplied from an oil pump P to the oil reservoir 26 via an oil supply passage 32 which is formed with the cylinder head 11. An opening 32A of the oil supply passage 32 is located in the oil reservoir 26 at the upper portion thereof, which allows oil storage therein below the opening 32A even upon engine standstill.

As best seen in FIGS. 3 and 4, the chain case 12 if formed with an air bleeder 33 which opens opposite to the outer peripheral surface 24 of the body 21 at the upper portion thereof. Air in the oil reservoir 26 is evacuated to the chain chamber 57 through the air bleeder 33.

As best seen in FIG. 4, for defining an oil passage 40 to allow fluid communication of the oil reservoir 26 with the damping chamber 27, the body 21 is formed with two passage bores 35, and 36: one 35 opens to the lower portion to the peripheral cutout 34, and the other 36 fluidly communicates with the bore 35 and the damping chamber 27. For passing oil exclusively from the oil reservoir 26 to the damping chamber 27, a check valve 37 is installed in the passage bore 36. The check valve 37 includes a sleeve 38 press fitted into the passage bore 36, a ball 39 placed at the bottom of the sleeve 38, a return spring 41 biasing the ball 39, and a retainer (43) receiving the return spring 41.

The plunger 22 is formed with a shift bore 42 in which a spring 44 is installed. The spring 44 is supported, at the one end thereof, by the body 21 through the retainer 43, and biases the plunger 22 in such a direction as to protrude from the body 21. The outer peripheral surface 24 of body 21 is formed, at the upper portion thereof, with a top recess 45, and a passage bore 46 which fluidly communicates with the top recess 45 and the cylinder 23. Defined by the passage bore 46 and a screw 47 press fitted thereinto is a flow restrictor 48 which allows fluid communication of the damping chamber 27 with the oil reservoir 26.

The plunger 22 is formed with a plurality of notches 49 at the outer periphery thereof. Pressed by a spring 52 through a pin 60, a rachet 51 is engaged with one of the plurality of notches 49, which prevents the plunger 22 from withdrawing. As best seen in FIGS. 2 and 3, a hook 53 is arranged between the body 21 and the plunger 22 so as to prevent the plunger 22 from protruding. The hook 53 is disengaged by a slight withdrawl of the plunger 22, so that, upon engine mounting, the chain tensioner 7 can be assembled with the timing chain 4 installed, resulting in easy assembly operation of the chain tensioner 7.

Next, the operation of this embodiment will be described.

Discharged from the oil pump P, oil flows into the oil reservoir 26 via the oil supply passage 32. From this, oil passes through the peripheral cutout 34 and the oil passage 40, and flows into the damping chamber 27 through the check valve 37. On the other hand, as to oil evacuated from the damping chamber 27 under the pressure induced by the timing chain 4, it comes to the top recess 45 via the flow restrictor 48. After overflowing the top recess 45, this oil flows into the oil reservoir 26 via the peripheral cutout 34.

During engine operation, the timing chain 4 inclines to vibrate due to periodic change of the tension induced by a variation in engine speed. The plunger 22 repeatedly protrudes and withdraws through the chain guide 6 in response to the vibration of the chain 4. Oil within the oil reservoir 26 is drawn in the damping chamber 27 via the oil passage 40 when the plunger 22 protrudes, whereas the same within the damping chamber 27 is evacuatted to the top recess 45 via the flow restrictor 48 when the plunger 22 withdraws. The vibration of the timing chain 4 is restrained by the flow resistance which is given to oil flow when passing through the flow restrictor 48.

Air bubbles are found in oil which circulates in the engine 1, and also in the same which flows into the oil reservoir 26 via the oil supply passage 32. The air bubbles separate from oil during stay of oil in the oil reservoir 26, and go up to the upper portion of the oil reservoir 26. Passing through narrow clearance defined by the bore 13 and the outer peripheral surface 24 of the body 21, such air is quickly evacuated outside through the air bleeder 33 formed with the chain case 12.

Since the oil reservoir 26 is formed between the chain case 12 and the body 21, and it has an adequate capacity for oil due to the two lateral recesses 25 of the body 21, and the top recess 45 of the upper portion of the body 21, it is possible to increase the duration of stay of oil in the oil reservoir 26 so as to eliminate enough the air bubbles. Thus, the air is prevented from introducing the damping chamber 27, resulting in a continuation of good buffer action.

Further, oil is stored in the oil reservoir 26 even upon engine standstill so that, when the plunger 22 in a withdrawn position is urged to move in a protruded position upon engine start, oil within the oil reservoir 26 is drawn in the damping chamber 27 via the oil passage 40, thus preventing air suction from the outside.

Still further, since the oil reservoir 26 is formed between the chain case 12 and the body 21, a casing is not needed to define the oil reservoir 26, thus restraining the chain tensioner 7 from enlarging in size.

Still further, since the oil reservoir 26 is defined by the two lateral recesses 25 and the top recess 45 of the body 21, which allows an adequate capacity for oil, a diameter of the bore 13 formed with the chain case 12 can be reduced, thus minimizing decrease in a mechanical strength of the chain case 12.

Furthermore, since the chain case 12 to which the body 21 is attached is integrated with the cylinder head 11, a rigidity for supporting the chain tensioner 7 is sufficiently assured.

What is claimed is:

1. An engine comprising:
   a chain tensioner body formed with a cylindrical bore having one end closed;

a plunger slidably defining within said cylindrical bore, said plunger defining within said cylindrical bore a variable volume chamber;

means for defining an oil reservoir;

one-way passage means for allowing a one-way flow of oil from said oil reservoir to said variable volume chamber, but preventing the reverse flow;

said oil reservoir defining means including, a predetermined engine component part with a mounting site;

said chain tensioner body cooperating with said predetermined engine component part at said mounting site to define therebetween said oil reservoir.

2. An engine as claimed in claim 1, wherein said predetermined engine component part is provided with air bleeder means communicating with said oil reservoir.

3. An engine as claimed in claim 1, wherein said predetermined engine component part is formed with an oil supply passage having one end communicating with said oil reservoir.

4. An engine as claimed in claim 1, including means for supplying oil to said oil supply passage.

5. An engine as claimed in claim 1, wherein said predetermined engine component part is a chain case formed with a protuberance, said protuberance being formed with a cylindrical through bore and having wall means defining said cylindrical through bore.

6. An engine as claimed in claim 5, wherein said chain tensioner body includes a generally cylindrical portion extending through said cylindrical through bore of said chain case and a flange portion mounted on said chain case to close one end of said cylindrical through bore.

7. An engine as claimed in claim 6, wherein said generally cylindrical portion carries a sealing member in a sealing engagement with said cylindrical through bore defining wall means to define said oil reservoir between said flange portion of said chain tensioner body, said generally cylindrical portion of said chain tensioner body, and said cylindrical through bore defining wall means.

8. An engine as claimed in claim 7, including a gasket disposed between flange portion of said chain tensioner body and said chain case.

9. An engine as claimed in claim 7, wherein said air bleeder means extends through said protuberance of said chain case.

10. An engine as claimed in claim 7, wherein said oil supply passage extends through said protuberance.

11. As engine as claimed in claim 7, wherein said generally cylindrical portion of said chain tensioner body is formed with two lateral recesses and has two parallel flat wall means defining, in part, said two recesses, respectively, said lateral recesses forming two major portions of said oil reservoir.

12. An engine as claimed in claim 11. wherein said generally cylindrical portion is formed with a top recess forming a working portion of said oil reservoir.

13. An engine as claimed in claim 12, wherein said air bleeder means communicates with said working portion of said oil reservoir.

14. An engine as claimed in claim 11, wherein said oil supply passage communicates with one of said two major portions of said oil reservoir.

15. An engine as claimed in claim 1, including flow restrictor means for restricting flow of oil from said variable volume chamber to said oil reservoir, said flow restrictor means having one end communicating with said working portion of said oil reservoir.

16. An engine as claimed in claim 11, wherein said one-way passage means having one end communicating with said major portions of said oil reservoir.

* * * * *